US012808494B2

(12) United States Patent
Xiao et al.

(10) Patent No.: US 12,808,494 B2
(45) Date of Patent: Nov. 24, 2026

(54) LIGHTING ASSEMBLY AND LIGHTING DEVICE

(71) Applicant: SAVANT TECHNOLOGIES LLC, East Cleveland, OH (US)

(72) Inventors: Kun Xiao, Shanghai (CN); Qingkai Wang, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 19/215,955

(22) Filed: May 22, 2025

(65) Prior Publication Data

US 2026/0016130 A1 Jan. 15, 2026

(51) Int. Cl.

| | |
|---|---|
| ***F21K 9/238*** | (2016.01) |
| ***F21V 23/00*** | (2015.01) |
| *F21Y 113/13* | (2016.01) |
| *F21Y 115/10* | (2016.01) |

(52) U.S. Cl.

CPC ............ *F21K 9/238* (2016.08); *F21V 23/001* (2013.01); *F21V 23/003* (2013.01); *F21Y 2113/13* (2016.08); *F21Y 2115/10* (2016.08)

(58) Field of Classification Search

CPC ............... F21K 9/238; F21K 9/23–237; F21K 9/27–278

See application file for complete search history.

(56) References Cited

U.S. PATENT DOCUMENTS

| | | | | |
|---|---|---|---|---|
| 11,251,165 B2 | 2/2022 | Lin et al. | | |
| 11,466,816 B2 | 10/2022 | Onushkin et al. | | |
| 2007/0121319 A1* | 5/2007 | Wolf | H05B 47/155 362/231 | |
| 2019/0086037 A1* | 3/2019 | Cairns | F21V 23/006 | |

* cited by examiner

*Primary Examiner* — Sean P Gramling

(74) *Attorney, Agent, or Firm* — WOOD IP LLC

(57) ABSTRACT

Provided is a lighting assembly and a lighting device. The lighting assembly includes a receiver, connected to an external source by a first number of wires to receive a first power signal and a control signal from the external source, the control signal indicating driving parameters of each LED, and a first driver, connected to the receiver to receive the first power signal and the control signal, output a driving signal for controlling each LED, and connected to the LEDs by a second number of wires to output the driving signal to the LEDs for driving the LEDs, the first number is less than the second number. By the lighting assembly, the present disclosure can reduce the number of wire connections between LEDs inside the lighting device and the external signal source or the power source.

16 Claims, 5 Drawing Sheets

LIGHTING ASSEMBLY AND LIGHTING DEVICE

CROSS-REFERENCE TO RELATED APPLICATIONS

This application claims priority to Chinese Patent Application Serial Number 202421408229.4, filed Jun. 19, 2024, which is herein incorporated by reference.

TECHNICAL FIELD

The present disclosure relates to the field of filament-type LED lamps, and more particularly to a device for use inside a filament-type LED lamp.

BACKGROUND

A filament-type LED lamp is an efficient and energy-saving lighting product, but a conventional filament-type LED lamp exists many problems.

Specifically, during practical use, the filament-type LED lamp has a complex design, and is prone to failure, which shortens the service life of the lamp and requires frequent replacement, thereby increasing the maintenance and replacement costs. Since the filament-type LED lamp requires manual welding and has a high requirement for welding technology, it is difficult for workers to grasp the welding technology, which easily causes problems such as unstable welding and affects the use effect of the lamp. Due to the complex structure of the lamp, the appearance of the lamp may be not beautiful enough, affecting the aesthetic degree of the lamp in indoor decoration; due to the complex structure of the lamp, the lamp needs to be formed by assembling a plurality of components and parts, and the production cost is relatively high, resulting in a relatively high selling price of the product and affecting the market competitiveness of the product; and due to unstable welding or poor quality of the components and parts, poor contact of the lamp easily occurs, affecting the light emitting effect and stability of the lamp.

In order to solve these problems, the present application aims to reduce the number of wire connections between LEDs inside the LED lamp and an external signal source or a power source by adopting new design and manufacturing techniques.

SUMMARY OF THE INVENTION

In view of this, the present disclosure provides an improved lighting device, in which the number of wire connections between LEDs inside the lighting device and an external signal source or the power source is reduced, which not only improves the product quality by reducing poor contact caused by welding, but also improves the aesthetic degree of the lighting device and reduces the size of the lighting device.

According to one aspect of the present disclosure, provided is a lighting assembly, having a plurality of LEDs, wherein the lighting assembly comprises: a receiver, connected to an external source by a first number of wires to receive a first power signal and a control signal from the external source, the control signal indicating driving parameters of each LED in the plurality of LEDs; and a first driver, connected to the receiver to receive the first power signal and the control signal, output a driving signal for controlling each LED, and connected to the plurality of LEDs by a second number of wires to output the driving signal to the plurality of LEDs for driving the plurality of LEDs; wherein the first number is less than the second number.

In this way, the present disclosure reduces the number of wire connections between the LEDs inside a lamp and the external source by the lighting assembly provided inside a lighting device, a wire connection between the device and the external source, and a wire connection between the device and the plurality of LEDs. Since the number of wires connected to the external source is reduced, poor contact caused by welding is reduced, the product quality is improved, the size of the lighting device is reduced, and the aesthetic degree of the lighting device is also improved.

According to exemplary embodiments of the present disclosure, the first number is two, wherein a first of the two wires simultaneously transmits the first power signal and the control signal, and a second wire is a neutral wire.

In this way, the first wire and the second wire provide a loop, which ensures current balance and provides the stability and reliability of a system. Without affecting the transmission of the power signal and the control signal, the internal LEDs are connected to the external source by two wires; this arrangement achieves simple wiring and effectively reduces the size of the lighting device.

According to exemplary embodiments of the present disclosure, the first number is three, wherein a first wire among the three wires transmits the first power signal, a second wire transmits the control signal, and a third wire is a neutral wire.

In this way, without affecting the transmission of the power signal and the control signal, the internal LEDs are connected to the external source by three wires; the arrangement can allow for independent control of the supply of the power signal and the supply of the control signal, such that an operator can flexibly control the lighting device.

According to exemplary embodiments of the present disclosure, the plurality of LEDs are connected to form a plurality of parallel branches, wherein one wire among the second number of wires is connected to one electrode of each LED of the plurality of parallel branches, and the remaining wires are connected to the other electrode of each LED of the plurality of parallel branches, respectively.

In this way, the plurality of LEDs work together while remaining individually independent. By the parallel connection, the LEDs do not affect each other, and even if one of the LEDs fails, normal operation of the other LEDs will not be affected. In addition, by connecting the plurality of LEDs in parallel, a larger lighting area and a brighter lighting effect can be achieved. Moreover, this connection mode can also reduce the load on a power supply, and prolong the service life of the LED lamps.

According to exemplary embodiments of the present disclosure, the plurality of LEDs at least comprise red LEDs emitting red light, green LEDs emitting green light, blue LEDs emitting blue light, and yellow LEDs emitting yellow light.

In this way, the present disclosure realizes a color-changing lamp by a combination of LEDs of multiple colors, and the colors of the LEDs in the present disclosure are not limited to the colors disclosed above, for example, the LEDs may also emit white light or the like.

According to exemplary embodiments of the present disclosure, the plurality of red light LEDs are connected in series to form a first branch, the plurality of green light LEDs are connected in series to form a second branch, the plurality of blue light LEDs are connected in series to form a third branch, and the plurality of yellow light LEDs are connected in series to form a fourth branch; wherein the first branch, the second branch, the third branch and the fourth branch are respectively connected to the remaining wires, so as to be connected in parallel to the first driver.

In this way, the disclosure above describes the connection mode of the LEDs, in which the red, green, blue and yellow LEDs are connected in series respectively to form four branches, which are then connected in parallel to the driver. This connection mode can allow for controlling of LED lamps of different colors, and the brightness and color of the LEDs are controlled by adjusting the current of each branch, so as to achieve a colorful light effect. Moreover, the serial connection can ensure uniform distribution of the LEDs in the circuit, avoiding the failure of the whole lamp due to the failure of a single LED lamp. On the whole, such a connection mode can effectively control the light effects and colors of the LEDs, and improve the stability and reliability of the lamp. However, the connection mode of the LEDs of the present disclosure is not limited to that in the disclosure above.

According to exemplary embodiments of the present disclosure, the external source comprises: a second driver, connected to a power supply to receive a second power signal and convert the second power signal into the first power signal according to the control signal; a transmitter, connected to the second driver to receive the first power signal; and a controller, connected to the second driver and the transmitter to send the control signal to the second driver and the transmitter; wherein upon receiving the control signal, the transmitter transmits the first power signal and the control signal to the receiver of the device.

According to exemplary embodiments of the present disclosure, the external source comprises: a second driver, connected to a power supply to receive a second power signal and convert the second power signal into the first power signal according to the control signal; a transmitter, connected to the second driver to receive the first power signal and to transmit the first power signal to the receiver of the lighting assembly; and a controller, connected to the second driver and the first driver to send the control signal to the second driver and the first driver, respectively.

In this way, by the cooperation of these assemblies, the lighting assembly can receive a desired power signal from the external source to meet the operation requirements of the lighting device.

According to exemplary embodiments of the present disclosure, the receiver simultaneously receives the first power signal and the control signal from the transmitter by one wire by using a power line carrier (PLC) technology.

According to exemplary embodiments of the present disclosure, the receiver receives the first power signal and the control signal from the transmitter respectively via different wires by using a single-line return-to-zero code technology or a single-bus protocol.

In this way, the present disclosure describes the mode in which the receiver receives the power signals and the control signal from the transmitter by using different techniques. By using the power line carrier (PLC) technology, the receiver can simultaneously receive the first power signal and the control signal to achieve data transmission and remote control. In addition, by using the single-line return-to-zero code technology or the single-bus protocol, the receiver can respectively receive the first power signal and the control signal, so as to implement more flexible data transmission and control operations. The application of these techniques can improve the performance and efficiency of the lighting device, making communication more convenient and reliable.

According to another aspect of the present disclosure, provided is a lighting device, comprising: a power connector; a lampshade, fixedly connected to the power connector; a plurality of LEDs, arranged in the lampshade; and the lighting assembly; wherein the external source is provided in the power connector.

In this way, the present disclosure provides an improved lighting device which can improve the product quality, improve an aesthetic degree, and reduce the size by simple wiring.

In embodiments of the present disclosure, a technical solution of achieving simple wiring by providing the lighting assembly to reduce the number of wire connections between the LEDs inside the lighting device and the external signal source or the power source is provided, so as to at least solve the technical problems of low product quality, low aesthetic degree and large size of the lighting device in the related art, thereby achieving the technical effects of not only improving the product quality by reducing poor contact caused by welding, but also improving the aesthetic degree of the lighting device and reducing the size of the lighting device.

BRIEF DESCRIPTION OF THE DRAWINGS

The drawings illustrated herein are used for providing further understanding of the present disclosure, constitute a part of the present disclosure; and illustrative embodiments of the present disclosure and illustrations thereof are used for explaining the present disclosure, rather than constitute inappropriate limitations on the present disclosure. In the drawings.

DETAILED DESCRIPTION

Figure 1:
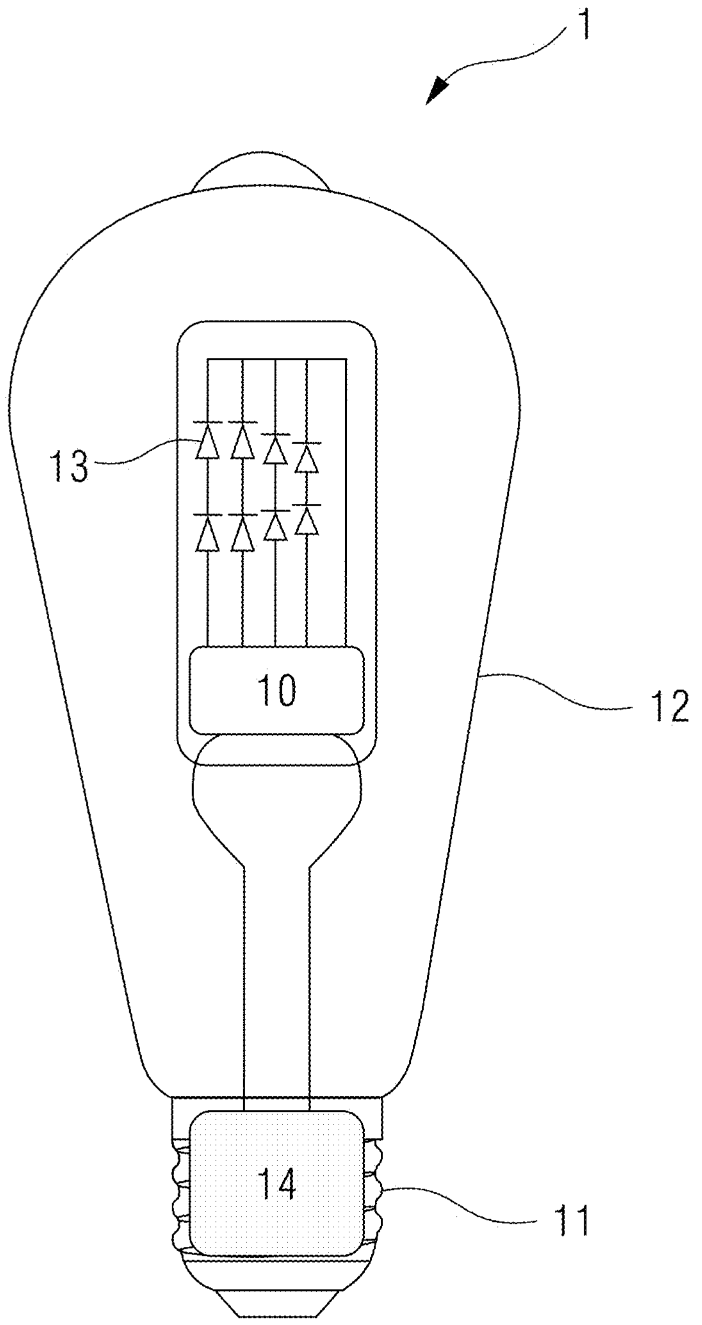
FIG. 1 is a schematic diagram of the appearance of a lighting device according to a first embodiment of the present disclosure.

Hereinafter, embodiments of the present application will be described in detail with reference to the accompanying drawings, such that a person skilled in the art could easily implement the embodiments of the present application. The present application may, however, be embodied in many different forms, and should not be construed as limited to the embodiments set forth herein. In the drawings, parts irrelevant to the illustration of the present application will be omitted for clarity. Similar reference numerals refer to similar elements throughout the illustration. In addition, when the illustration with reference to the drawings is provided, although elements are denoted by the same numeral, the reference numerals involving the elements may be changed; and the reference numerals are illustrated only for convenience of illustration, and should not be understood as limiting the concept, features, functions, or effects of the elements.

In the related art, a color-changing filament-type lamp usually comprises 5 wire connections. The large number of wire connections makes it difficult for workers to weld, which tends to produce lamp with poor contact, poor product quality, and poor appearance. Aiming at the problems in the related art, the present application aims to reduce the number of wire connections which pass through the lamp and connect internal LEDs to an external signal source and a power source, such that the wiring is simple, thereby reducing the welding difficulty, improving the product quality, and improving the appearance aesthetics.

FIG. 1 is a schematic diagram of the appearance of a lighting device according to a first embodiment of the present disclosure.

As shown in FIG. 1, a lighting device 1 comprises a power connector 11, a lampshade 12 fixedly connected to the power connector 11, a plurality of LEDs 13 arranged in the lampshade 12, a lighting assembly 10, an external source 14 and wires connecting various assemblies.

The modes of connection between the power connector 11 and the lampshade 12 mainly comprises screw connection, snap-fit connection, spring connection and magnetic attachment connection. The present disclosure is not limited to these connection modes.

Materials forming the lampshade 12 generally comprise: glass, metal, plastic, acrylic, wood, etc. The shape of the lampshade 12 may be any shape.

In the lampshade 12, one lighting assembly 10 may be provided, and a plurality of lighting assemblies 10 may also be provided.

The external source 14 provides a first power signal and a control signal, wherein the control signal indicates driving parameters of each LED in the plurality of LEDs 13, for example, indicates a turning-on or turning-off driving parameter. The external source 14 may be provided at any position outside the lampshade 12, for example, the external source 14 is provided in the power connector 11.

Figure 2:
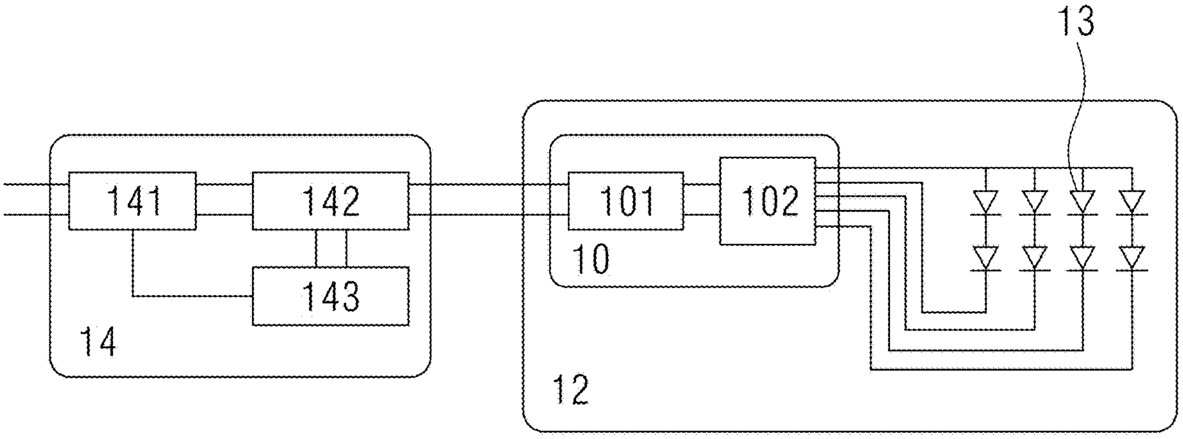
FIG. 2 is a structural block diagram of the lighting device according to the first embodiment of the present disclosure.

FIG. 2 is a structural block diagram of the lighting device according to the first embodiment of the present disclosure.

As shown in FIG. 2, each lighting assembly 10 comprises a receiver 101 and a first driver 102. In particular, the receiver 101 is connected to the external source 14 by a first number of wires to receive the first power signal and the control signal from the external source 14, the control signal indicating driving parameters of each LED in the plurality of LEDs 13. The first driver 102 is connected to the receiver 101 to receive the first power signal and the control signal, outputs a driving signal for controlling each LED, such as turning on or off each LED, and is connected to the plurality of LEDs 13 by a second number of wires to output the driving signal to the plurality of LEDs 13 for driving the plurality of LEDs 13. The first number is less than the second number.

In the first embodiment, the first number is two. In other words, the receiver 101 is connected to the external source 14 by two wires. A first wire of the two wires simultaneously transmits the first power signal and the control signal, and a second wire is a neutral wire. The first wire and the second wire jointly provide a complete loop, and complete power transmission and control signal transmission between the external source 14 and the plurality of LEDs 13 in the lampshade 12.

Since only two wires are lead out from the interior of the lampshade 12, the welding complexity of the wires is reduced, the size of the lighting device is reduced, and the aesthetic degree is improved.

Figure 3:
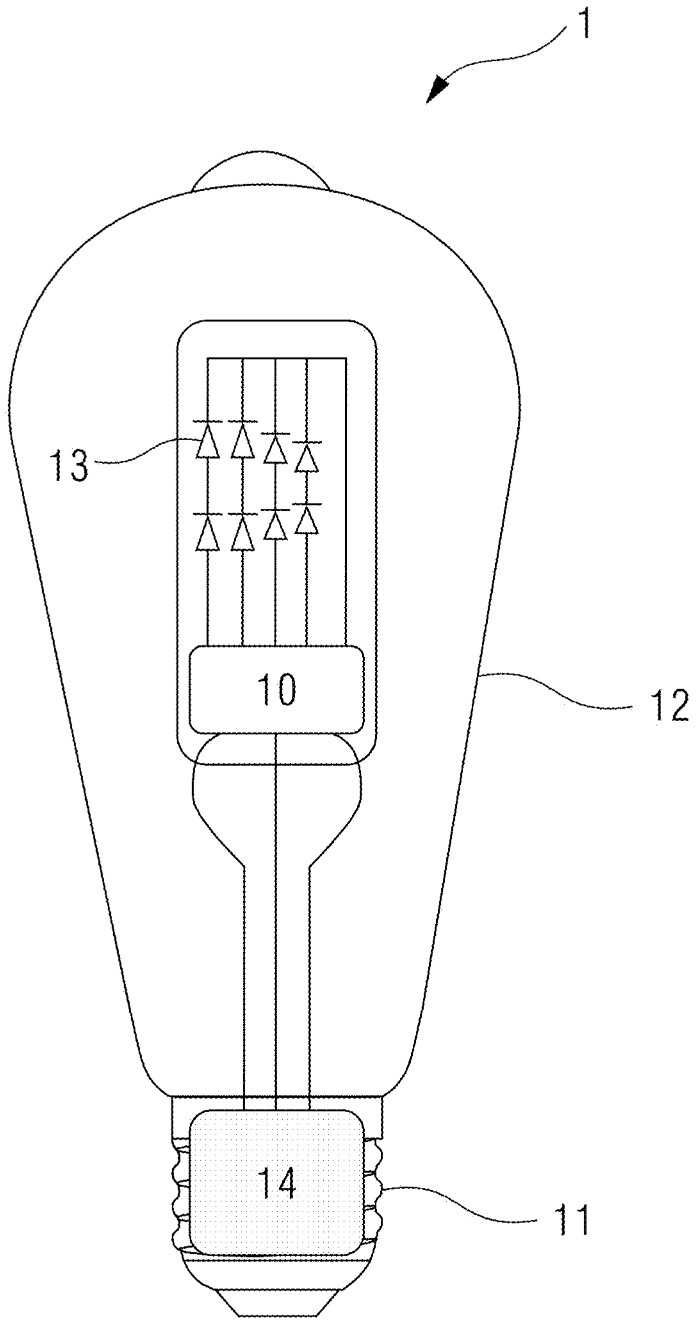
FIG. 3 is a schematic diagram of the appearance of a lighting device according to a second embodiment of the present disclosure.

In a second embodiment, the first number is three. As shown in FIG. 3, the receiver 101 is connected to the external source 14 by 3 wires. A first wire among the three wires transmits a first power signal, a second wire transmits a control signal, and a third wire is a neutral wire.

In contrast to the first embodiment, in the second embodiment, the transmission of the power signal and the transmission of the control signal can be independently controlled.

In the first embodiment or the second embodiment, the plurality of LEDs are connected to form a plurality of parallel branches, wherein one wire among the second number of wires is connected to positive electrodes of the LEDs of the plurality of parallel branches, and the remaining wires are connected to negative electrodes of the LEDs of the plurality of parallel branches, respectively.

The present disclosure is not limited to the parallel connection mode of the plurality of LEDs, and the plurality of LEDs may use one or more of a parallel connection mode, a series connection mode, or a series and parallel connection mode.

The plurality of LEDs 13 at least comprise red LEDs emitting red light, green LEDs emitting green light, blue LEDs emitting blue light, and yellow LEDs emitting yellow light.

The lighting device 1 of the present disclosure may be a color-changing lamp, and may control, on the basis of the control signal, LEDs of different colors to emit light, thereby achieving color changing of the lighting device 1. The light emitting colors of the LEDs are not limited to the colors above, and other light such as white light may also be emitted.

The plurality of red light LEDs are connected in series to form a first branch, the plurality of green light LEDs are connected in series to form a second branch, the plurality of blue light LEDs are connected in series to form a third branch, and the plurality of yellow light LEDs are connected in series to form a fourth branch; wherein the first branch, the second branch, the third branch and the fourth branch are respectively connected to the remaining wires, so as to be connected in parallel to the first driver 102.

In the present disclosure, the red, green, blue and yellow LEDs are connected in series respectively to form four branches, which are then connected in parallel to the driver. This connection mode can allow for controlling of LEDs of different colors, and the brightness and color of the LEDs are controlled by adjusting the current of each branch by the control signal, so as to achieve a colorful light effect. Moreover, the serial connection can ensure uniform distribution of the LEDs in the circuit, avoiding the failure of the whole lamp due to the failure of a single LED. On the whole, such a connection mode can effectively control the light effects and colors of the LEDs, and improve the stability and reliability of the lamp.

In this case, the second number is five, and the number of the remaining wires is 4. However, the number of the parallel branches in the present disclosure is not limited to 4, and a person skilled in the art may set more or less parallel branches as required.

Figure 4:
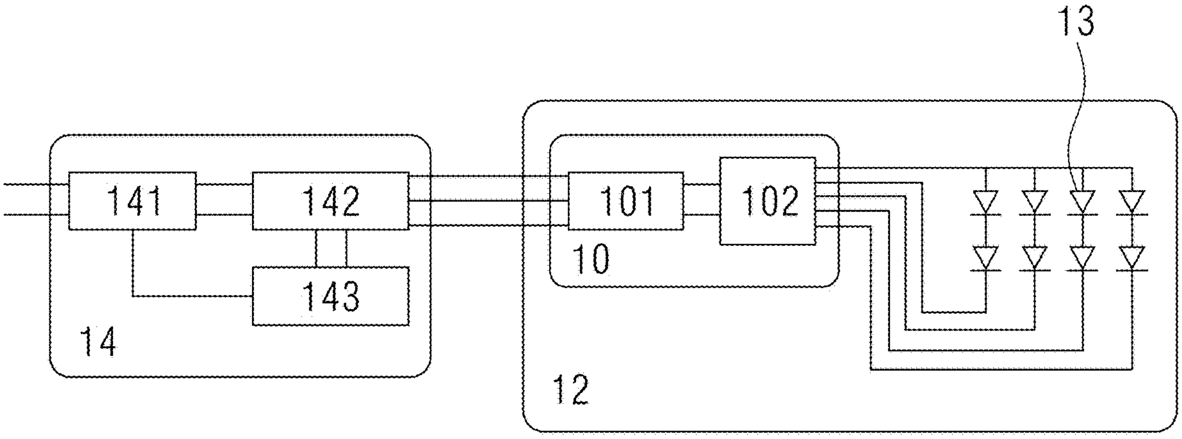
FIG. 4 is a structural block diagram of the lighting device according to the second embodiment of the present disclosure.

FIG. 2 is a structural block diagram of the lighting device according to the first embodiment of the present disclosure; FIG. 4 is a structural block diagram of the lighting device according to the second embodiment of the present disclosure; and FIG. 5 is a structural block diagram of a lighting device according to a third embodiment of the present disclosure.

As shown in FIG. 2, the receiver 101 of the lighting assembly 10 is connected to the external source 14 by two wires.

As shown in FIG. 4, the receiver 101 of the lighting assembly 10 is connected to the external source 14 by 3 wires.

Figure 5:
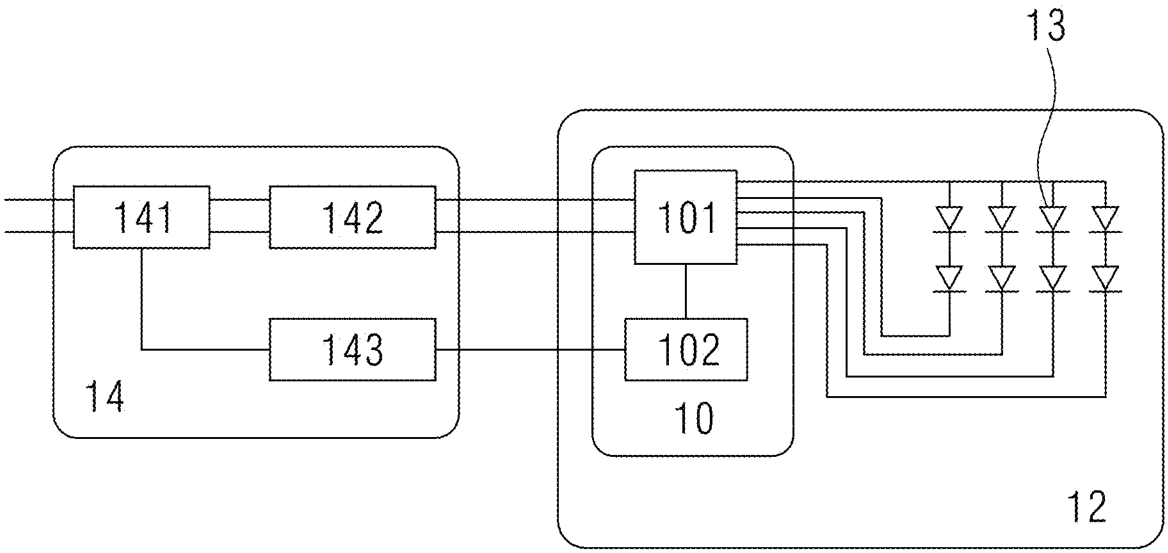
FIG. 5 is a structural block diagram of a lighting device according to a third embodiment of the present disclosure.

As shown in FIG. 5, the receiver 101 of the lighting assembly 10 is connected to the external source 14 by two wires, and the first driver 102 is connected to the external source 14 by one wire.

The external source 14 comprises: a second driver 141 which is connected to a power source so as to receive a second power signal and convert the second power signal into the first power signal according to the control signal; a transmitter 142, connected to the second driver 141 to receive the first power signal; and a controller 143, connected to the second driver 141 and the transmitter 142 to send the control signal to the second driver 141 and the transmitter 142; wherein upon receiving the control signal, the transmitter 142 transmits the first power signal and the control signal to the receiver 101 of the lighting assembly 10.

Specifically, the power source is, for example, a 220V power source. The second driver 141 receives a second power signal with a voltage of 220V from the power source, converts, according to the control signal received from the controller 143, the second power signal with 220V into a first power signal suitable for transmission or a first power signal suitable for driving the LEDs, and transmits the converted first power signal to the transmitter 142. The transmitter 142 transmits the received converted first power signal along with the control signal to the receiver 101 of the lighting assembly 10 according to the control signal received from the controller 143.

In the first embodiment, the receiver 101 and the transmitter 142 communicate with each other by using power line carrier (PLC) technology, such that the receiver 101 simultaneously receives the converted first power signal and the control signal by using one wire.

The power line carrier (PLC) technology is a communication technology that uses a power line to transmit a data signal. By superposing the data signal on the power line, information such as data, voice, video, and the like can be transmitted on the power line. The PLC technology is a convenient and fast communication mode, and does not need to separately lay network lines, thereby saving costs and space. The PLC technology can implement functions such as remote monitoring, remote control and data transmission, etc., and provides convenience for various application scenarios.

In the second embodiment, a single-line return-to-zero code technology or a single-bus protocol is used between the receiver 101 and the transmitter 142, such that the receiver 101 receives the converted first power signal and the control signal respectively, by using two wires.

In the third embodiment, the single-line return-to-zero code technology or single-bus protocol is used between the receiver 101, the transmitter 142 and the controller 143, such that the receiver 101 receives the converted first power signal by two wires; and the first driver 102 receives the control signal from the controller 143 by using one wire.

The single-line return-to-zero code technology is a digital communication technology, and is generally used for data transmission or coding. In this technology, a signal line changes from a high level to a low level in a data transmission process, and then returns to the high level again. Such a manner can ensure the accuracy and stability of data transmission as it provides a clear signal edge to represent the start and end of data.

The single-bus protocol is a protocol used for communication between electronic apparatuses, wherein all apparatuses communicate via a shared bus. In the single-bus protocol, each apparatus has a unique address, and data can be sent and received via the bus. This protocol is typically used to connect low-speed apparatuses, such as sensors, controllers, and peripherals. Common single-bus protocols comprise 1-Wire, I2C, etc.

In embodiments of the present disclosure, a technical solution of achieving simple wiring by providing a lighting assembly to reduce the number of wire connections between LEDs inside the lighting device and the external signal source or the power source is provided, so as to at least solve the technical problems of low product quality, low aesthetic degree and large size of the lighting device in the related art, thereby achieving the technical effects of not only improving the product quality by reducing poor contact caused by welding, but also improving the aesthetic degree of the lighting device and reducing the size of the lighting device.

In the embodiments above of the present disclosure, the illustration of each embodiment has its own emphasis. For the part not detailed in a certain embodiment, please refer to the relevant illustration in other embodiments.

In the several embodiments provided in the present disclosure, it should be understood that the disclosed technical content may be implemented in other manners.

The content above only relates to preferred embodiments of the present disclosure. It should be noted that for a person of ordinary skill in the art, several improvements and modifications can also be made without departing from the principle of the present disclosure, and these improvements and modifications shall also be considered as within the scope of protection of the present disclosure.

The invention claimed is:

1. A lighting assembly, having a plurality of LEDs, wherein the lighting assembly comprises:

a receiver, connected to an external source by a first number of wires to receive a first power signal and a control signal from the external source, the control signal indicating driving parameters of each LED in the plurality of LEDs; and a first driver, connected to the receiver to receive the first power signal and the control signal, output a driving signal for controlling each LED, and connected to the plurality of LEDs by a second number of wires to output the driving signal to the plurality of LEDs for driving the plurality of LEDs;

wherein the first number is less than the second number, wherein the first number is at least two, wherein a first of the two wires simultaneously transmits the first power signal and the control signal, and a second wire is a neutral wire.

2. The lighting assembly according to claim 1, wherein the first number is three, wherein a first wire among the three wires transmits the first power signal, a second wire transmits the control signal, and a third wire is a neutral wire.

3. The lighting assembly according to claim 1, wherein the plurality of LEDs are connected to form a plurality of parallel branches, wherein one wire among the second number of wires is connected to one electrode of each LED of the plurality of parallel branches, and the remaining wires are connected to the other electrode of each LED of the plurality of parallel branches, respectively.

4. The lighting assembly according to claim 3, wherein the plurality of LEDs at least comprise red LEDs emitting red light, green LEDs emitting green light, blue LEDs emitting blue light, and yellow LEDs emitting yellow light.

5. The lighting assembly according to claim 4, wherein the plurality of red light LEDs are connected in series to form a first branch, the plurality of green light LEDs are connected in series to form a second branch, the plurality of blue light LEDs are connected in series to form a third branch, and the plurality of yellow light LEDs are connected in series to form a fourth branch; wherein the first branch, the second branch, the third branch and the fourth branch are respectively connected to the remaining wires, so as to be connected in parallel to the first driver.

6. The lighting assembly according to claim 1, wherein the external source comprises:

a second driver, connected to a power source so as to receive a second power signal and convert the second power signal into the first power signal according to the control signal;

a transmitter, connected to the second driver to receive the first power signal; and a controller, connected to the second driver and the transmitter to send the control signal to the second driver and the transmitter;

wherein upon receiving the control signal, the transmitter transmits the first power signal and the control signal to the receiver of the lighting assembly.

7. The lighting assembly according to claim 1, wherein the external source comprises:

a second driver, connected to a power source so as to receive a second power signal and convert the second power signal into the first power signal according to the control signal;

a transmitter, connected to the second driver to receive the first power signal and to transmit the first power signal to the receiver of the lighting assembly; and a controller, connected to the second driver and the first driver to send the control signal to the second driver and the first driver, respectively.

8. The lighting assembly according to claim 6, wherein the receiver simultaneously receives the first power signal and the control signal from the transmitter via one wire by using a power line carrier technology.

9. The lighting assembly according to claim 6, wherein the receiver receives the first power signal and the control signal from the transmitter respectively via different wires by using a single-line return-to-zero code technology or a single-bus protocol.

10. A lighting device, comprising:

a power connector;

a lampshade, fixedly connected to the power connector;

a plurality of LEDs, arranged in the lampshade; and a lighting assembly having one end connected to an external source by a first number of wires and the other end connected to the plurality of LEDs by a second number of wires, wherein the lighting assembly has a receiver receiving a first power signal and a control signal from the external source, the control signal indicating driving parameters of each LED in the plurality of LEDs, and a first driver, connected to the receiver to receive the first power signal and the control signal, output a driving signal for controlling each LED, to output the driving signal to the plurality of LEDs for driving the plurality of LEDs;

the external source is provided in the power connector;

wherein the first number is less than the second number.

11. A lighting device according to claim 10, wherein the receiver, connected to an external source by a first number of wires, the first driver has one end connected to the receiver and other end connected to the plurality of LEDs by a second number of wires.

12. The lighting device according to claim 11, wherein the external source comprises:

a second driver, connected to a power source so as to receive a second power signal and convert the second power signal into the first power signal according to the control signal;

a transmitter, connected to the second driver to receive the first power signal; and a controller, connected to the second driver and the transmitter to send the control signal to the second driver and the transmitter;

wherein upon receiving the control signal, the transmitter transmits the first power signal and the control signal to the receiver of the lighting assembly.

13. A lighting device according to claim 10, wherein the receiver has one end connected to the plurality of LEDs by a second number of wires.

14. The lighting device according to claim 13, wherein the external source comprises:

a second driver, connected to a power source so as to receive a second power signal and convert the second power signal into the first power signal according to the control signal;

a transmitter, connected to the second driver to receive the first power signal and to transmit the first power signal to the receiver of the lighting assembly; and a controller, connected to the second driver and the first driver to send the control signal to the second driver and the first driver, respectively.

15. The lighting device according to claim 12, wherein the receiver simultaneously receives the first power signal and the control signal from the transmitter via one wire by using a power line carrier (PLC) technology.

16. The lighting device according to claim 12, wherein the receiver receives the first power signal and the control signal from the transmitter respectively via different wires by using a single-line return-to-zero code technology or a single-bus protocol.

* * * * *